Figure 1:
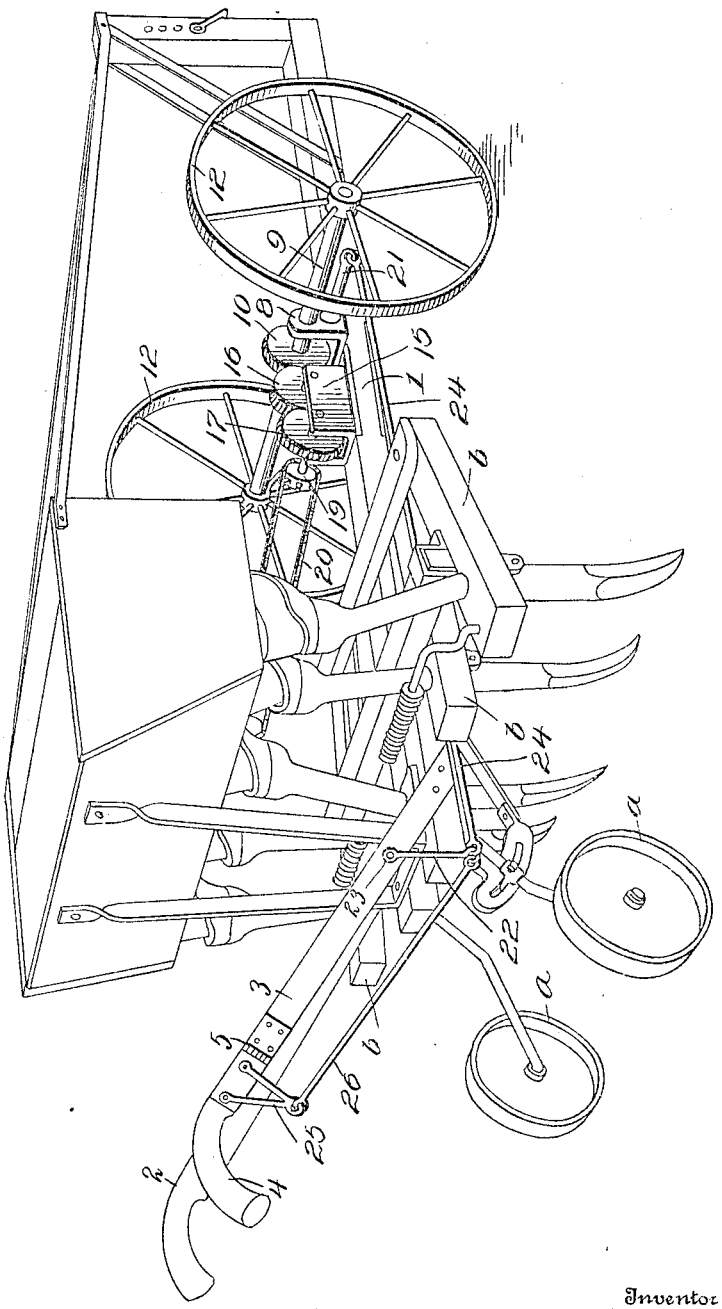

M. L. SMOCK.
SEED PLANTER.
APPLICATION FILED APR. 15, 1909.

926,777.

Patented July 6, 1909.
2 SHEETS—SHEET 1.

Witnesses
W. F. Hoyle
J. W. Garner

Inventor
Maurice L. Smock.
By Victor J. Evans
Attorney

M. L. SMOCK.
SEED PLANTER.
APPLICATION FILED APR. 15, 1909.
926,777.
Patented July 6, 1909.
2 SHEETS—SHEET 2.
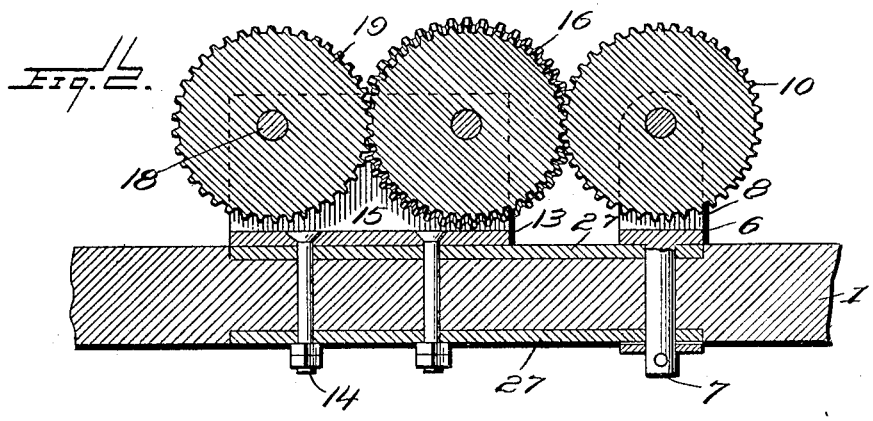
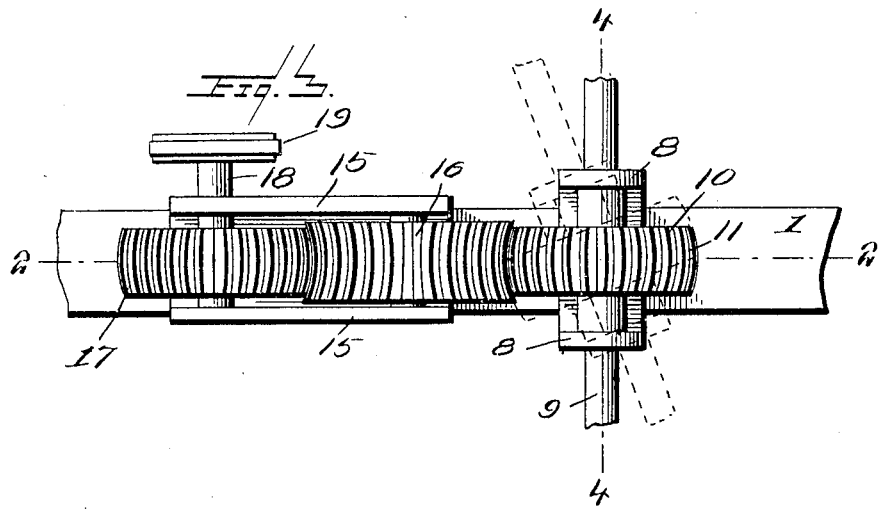
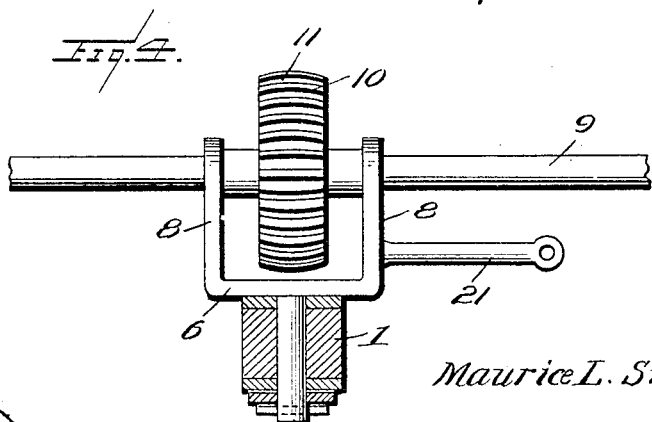
Witnesses
Inventor
Maurice L. Smock.
By Victor J. Evans
Attorney

UNITED STATES PATENT OFFICE.

MAURICE L. SMOCK, OF SOUTHPORT, INDIANA.

SEED-PLANTER.

No. 926,777. Specification of Letters Patent. Patented July 6, 1909.

Application filed April 15, 1909. Serial No. 490,006.

*To all whom it may concern:*

Be it known that I, MAURICE L. SMOCK, a citizen of the United States, residing at Southport, in the county of Marion and State of Indiana, have invented new and useful Improvements in Seed-Planters, of which the following is a specification.

This invention is an improved guiding and supporting device for use in connection with an agricultural machine, such as a grain drill or planter of other form, the object of the invention being to provide means whereby the operator who walks in rear of the machine may readily guide and control it, as hereinafter described and claimed.

In the accompanying drawings:—Figure 1 is a perspective view of a guiding and supporting device constructed in accordance with my invention, showing the same attached to a one horse grain drill. Fig. 2 is a detailed vertical longitudinal sectional view of my improved guiding and supporting device on line 2—2 of Fig. 3. Fig. 3 is a detailed plan of the same. Fig. 4 is a detailed view being partly a transverse section and partly a rear elevation.

The grain drill or other form of planter in connection with which my improved guiding and supporting device is adapted to be used may be of any of the usual forms and is here shown as a one horse grain drill provided with adjustable rear supporting wheels *a* and a number of angularly arranged beams *b* which are appropriately spaced apart.

In accordance with my invention, I provide a beam 1 which is disposed and secured between two of the beams *b* so that the said beam 1 extends under the center of the grain drill and also projects forwardly and rearwardly therefrom. A pair of handle bars 2—3, extend rearwardly and upwardly from the rear end of the beam 1 their lower ends being secured to opposite sides thereof. The handle 4 of the handle bar 3 is hinged or pivotally connected thereto as at 5 so that the said handle may be disposed either in line with the said handle bar 3 or at any desired angle thereto. At the upper side of the beam 1, at a suitable distance from the front end thereof, is a yoke 6 which is provided with a centrally disposed downwardly extending pin 7 which passes through an opening in and pivotally mounts said yoke on the beam 1, and at the ends of said yoke are upwardly extending bearings 8, in which a revolving axle shaft 9 is mounted. On the center of the said shaft, midway between the bearings 8, is a gear wheel 10, the peripheral face of which forms the segment of a sphere and is provided with convex spur teeth 11. On the ends of the said axle shaft are supporting and guiding wheels 12. On the beam 1 at a suitable distance in rear of the pivotally mounted yoke 6 is a plate 13 secured by bolts 14 and which is provided with upturned side bearings 15 in which are mounted the journals or axles of gears 16, 17. The gear 16 has a concave peripheral spurred face the radius of which coincides with that of the convex face of the gear 10 and is engaged by said gear 10. The gear 17 is similar to the gear 10 and has a convex peripheral face which forms the segment of a sphere.

It will be understood from the foregoing and by reference to Fig. 3 of the drawings that owing to the provision of the convex face of the gear 10 and the matching concave face of the gear 16 said gear 10 is kept in engagement with said gear 16 whether said gear 10 is in line with or at an angle, within certain limits, of the gear 16, and hence the yoke 6 which is pivotally mounted and which carries the rear supporting wheels and their axle shaft may be disposed at any angle with reference to the beam 1 that is required in order to properly guide or direct the machine. Furthermore it will be understood that the gear 16 with the concave face is an idler which serves to transmit power and motion to the gear 17 from the gear 10. On one end of the shaft 18 of the gear 17 is a sprocket wheel 19 which is connected by an endless sprocket chain 20 to a driving gear, not here shown, but which is of usual construction of the grain drill or other planter. It will be understood that the gear 10 is revolved by the wheels 12, and axle shaft 9 transmits motion to the gear 17 by means of the gears 11, 16, and that the sprocket wheel 19 which revolves with the gear 17 serves, by means of the endless sprocket chain, to drive the seed dropping mechanism of the planter or grain drill.

An arm 21 projects from one side of the pivotally mounted yoke 8 which has the bearings for the axle shaft. A rock link 22 depends from and has its upper end pivotally connected to the handle bar 3, as as 23. The lower end of this rock link is connected by a rod 24 to the arm 21. An arm 25 exa convex spured peripheral face constituting a segment of a sphere, an idler gear mounted on said supporting element, engaging said axle gear and having a concave spured face, a power transmission gear mounted on said supporting element and having the convex peripheral spured face engaging said idler gear; and a lever and connections for turning said pivoted bearing as may be required to cause said axle shaft and supporting wheels to guide or direct the drill or planter.

3. A guiding and supporting mechanism for drills or planters comprising a beam for attachment to a drill or planter, a bearing element pivotally mounted on said beam for angular movement in a horizontal plane, an axle shaft mounted in said pivotally mounted bearing element, said axle shaft having guiding and supporting wheels and also having at its center a gear wheel, an idler gear mounted on the beam and engaged with the axle gear, a power transmission gear mounted on the beam and engaged with the idler gear, a handle bar secured to the beam, a handle lever pivotally connected to one of said handle bars, a pivoted rod link, a rod connecting the same to the handle lever and a rod connecting said rod link to the pivotally mounted bearing, for the purpose set forth.

In testimony whereof I affix my signature in presence of two witnesses.

MAURICE L. SACK.

Witnesses:

WILLIAM J. HANCOCK,
EARL B. COPELAND.

tends downwardly from the pivoted handle or lever 4 and is connected 26 to the rod link 22 and it will be understood that the operator walks in rear of the machine with the handle may by appropriate the handle or lever 4 cause the turned as may be required to cause shaft and the supporting wheels guide the machine as may be To prevent wear of the beam wear plates 27 which are secured in the upper and lower sides shown in Fig. 2.

What is claimed is:—

1. A guiding and supporting for drills and other planters supporting element for attaching drill or planter, a bearing mounted supporting element for angular in a horizontal plane, an axle shaft in said bearing and having wheels, a power transmitting connecting power transmitting axle shaft and admitting of movement of said axle shaft, and connections for turning said bearing 2. A guiding and supporting for grain drills and other planters a supporting element for attaching drill or planter, a bearing element on said supporting element for movement in a horizontal plane, an mounted in said bearing element ing guiding and supporting wheels the said axle shaft, in line with the pivot of the bearing element